US010462357B2

(12) United States Patent
Ito

(10) Patent No.: US 10,462,357 B2

(45) **Date of Patent: *Oct. 29, 2019**

(54) PHOTOGRAPHING APPARATUS, METHOD AND MEDIUM USING IMAGE RECOGNITION

(71) Applicant: FUJIFILM Corporation, Minato-ku, Tokyo (JP)

(72) Inventor: Wataru Ito, Kanagawa-ken (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,337

(22) Filed: Sep. 12, 2018

(65) Prior Publication Data

US 2019/0028636 A1 Jan. 24, 2019

Related U.S. Application Data

(62) Division of application No. 15/613,304, filed on Jun. 5, 2017, now Pat. No. 10,110,803, which is a division (Continued)

(30) Foreign Application Priority Data

Jan. 21, 2004 (JP) ................................ 2004-013112

(51) Int. Cl.

*H04N 5/232* (2006.01)
*G06K 9/00* (2006.01)

(Continued)

(52) U.S. Cl.

CPC ....... *H04N 5/23219* (2013.01); *G06K 9/0061* (2013.01); *G06K 9/00248* (2013.01);

(Continued)

(58) Field of Classification Search

CPC ............. H04N 5/23219; H04N 1/2112; H04N 5/23222; H04N 2201/0084; G06T 5/005;

(Continued)

(56) References Cited

U.S. PATENT DOCUMENTS 5,500,673 A 3/1996 Zhou
5,570,434 A 10/1996 Badiqué

(Continued)

FOREIGN PATENT DOCUMENTS

JP 10233929 A 9/1998
JP 10234004 A 9/1998

(Continued)

OTHER PUBLICATIONS

William, O. et al., "A Sparse Probabilistic Learning Algorithm for Real-Time Tracking," Computer Vision, 2003 IEEE, pp. 353-360, vol. 1.

*Primary Examiner* — Lin Ye
*Assistant Examiner* — Chan T Nguyen
(74) *Attorney, Agent, or Firm* — Sughrue Mion, PLLC

(57) ABSTRACT

Processing for judging whether a face is included in a frame is performed, in a predetermined interval, on each of frames included in a moving image of a subject, displayed on a monitor, until the judgment becomes positive. If it is judged that a face is included in a frame, the facial position is detected in the frame, and stored. Then, judgment is made as to whether a face is included in the next frame after predetermined time. If the judgment is positive, the facial position is detected. The previously stored facial position is replaced by the newly detected facial position, and the newly detected facial position is stored. These processes are repeated until photographing operation is performed by operating a release unit.

31 Claims, 12 Drawing Sheets

Related U.S. Application Data of application No. 14/560,736, filed on Dec. 4, 2014, now Pat. No. 9,712,742, which is a division of application No. 13/644,316, filed on Oct. 4, 2012, now Pat. No. 8,948,470, which is a division of application No. 13/169,282, filed on Jun. 27, 2011, now Pat. No. 8,306,285, which is a division of application No. 11/963,002, filed on Dec. 21, 2007, now Pat. No. 7,991,200, which is a division of application No. 11/037,069, filed on Jan. 19, 2005, now Pat. No. 7,327,886.

(51) Int. Cl.

| | |
|---|---|
| ***G06T 5/00*** | (2006.01) |
| ***H04N 1/21*** | (2006.01) |
| ***G06T 7/73*** | (2017.01) |

(52) U.S. Cl.

CPC ..... *G06K 9/00261* (2013.01); *G06K 9/00281* (2013.01); *G06T 5/005* (2013.01); *G06T 7/74* (2017.01); *H04N 1/2112* (2013.01); *H04N 5/23222* (2013.01); *G06T 2207/10004* (2013.01); *G06T 2207/10016* (2013.01); *G06T 2207/30201* (2013.01); *G06T 2207/30216* (2013.01); *H04N 2201/0084* (2013.01)

(58) Field of Classification Search

CPC ............. G06T 7/74; G06T 2207/10004; G06T 2207/10016; G06T 2207/30216; G06T 2207/30201; G06K 9/00248; G06K 9/00261; G06K 9/0061; G06K 9/00281

USPC ....................................................... 348/231.6

See application file for complete search history.

(56) References Cited

U.S. PATENT DOCUMENTS

| | | | | |
|---|---|---|---|---|
| 5,680,481 | A | 10/1997 | Prasad et al. | |
| 6,108,437 | A | 8/2000 | Lin | |
| 6,639,998 | B1 | 10/2003 | Lee et al. | |
| 6,919,892 | B1 | 7/2005 | Cheiky et al. | |
| 6,940,545 | B1 | 9/2005 | Ray et al. | |
| 7,085,402 | B2 | 8/2006 | Lee et al. | |
| 7,120,278 | B2 | 10/2006 | Sukegawa et al. | |
| 7,269,292 | B2 | 9/2007 | Steinberg | |
| 7,327,886 | B2 | 2/2008 | Ito | |
| 7,492,924 | B2 | 2/2009 | Rodyushkin et al. | |
| 2003/0128389 | A1* | 7/2003 | Matraszek | G06K 9/6267 358/1.18 |
| 2003/0160879 | A1 | 8/2003 | Robins et al. | |
| 2003/0202685 | A1 | 10/2003 | Shimizu | |
| 2004/0125423 | A1 | 7/2004 | Nishi | |
| 2005/0025474 | A1 | 2/2005 | Ono | |
| 2005/0105827 | A1 | 5/2005 | Yonaha et al. | |
| 2006/0140486 | A1* | 6/2006 | Kondo | G06K 9/00248 382/224 |
| 2006/0170791 | A1 | 8/2006 | Porter et al. | |
| 2006/0215924 | A1* | 9/2006 | Steinberg | G06K 9/00228 382/254 |
| 2008/0317339 | A1 | 12/2008 | Steinberg | |
| 2009/0003708 | A1 | 1/2009 | Steinberg | |
| 2010/0053368 | A1* | 3/2010 | Nanu | G06K 9/00248 348/224.1 |

FOREIGN PATENT DOCUMENTS

| | | | |
|---|---|---|---|
| JP | 11127321 | A | 5/1999 |
| JP | 2000305141 | A | 11/2000 |
| JP | 2005210288 | A | 8/2005 |

* cited by examiner

| 1 | 1 | 1 |
|---|---|---|
| 0 | 0 | 0 |
| -1 | -1 | -1 |
FIG.2A
| 1 | 0 | -1 |
|---|---|---|
| 1 | 0 | -1 |
| 1 | 0 | -1 |
FIG.2B
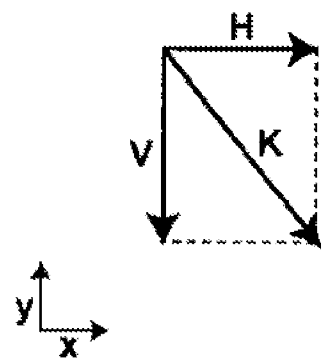
FIG.3
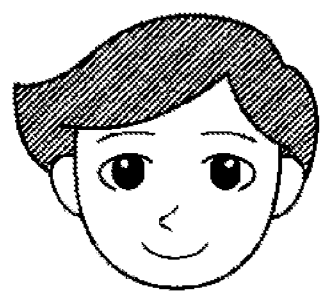
FIG.4A
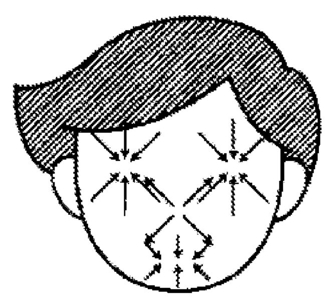
FIG.4B

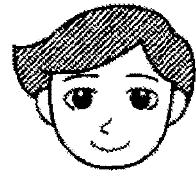
FIG.7A
FIG.7B
FIG.7C
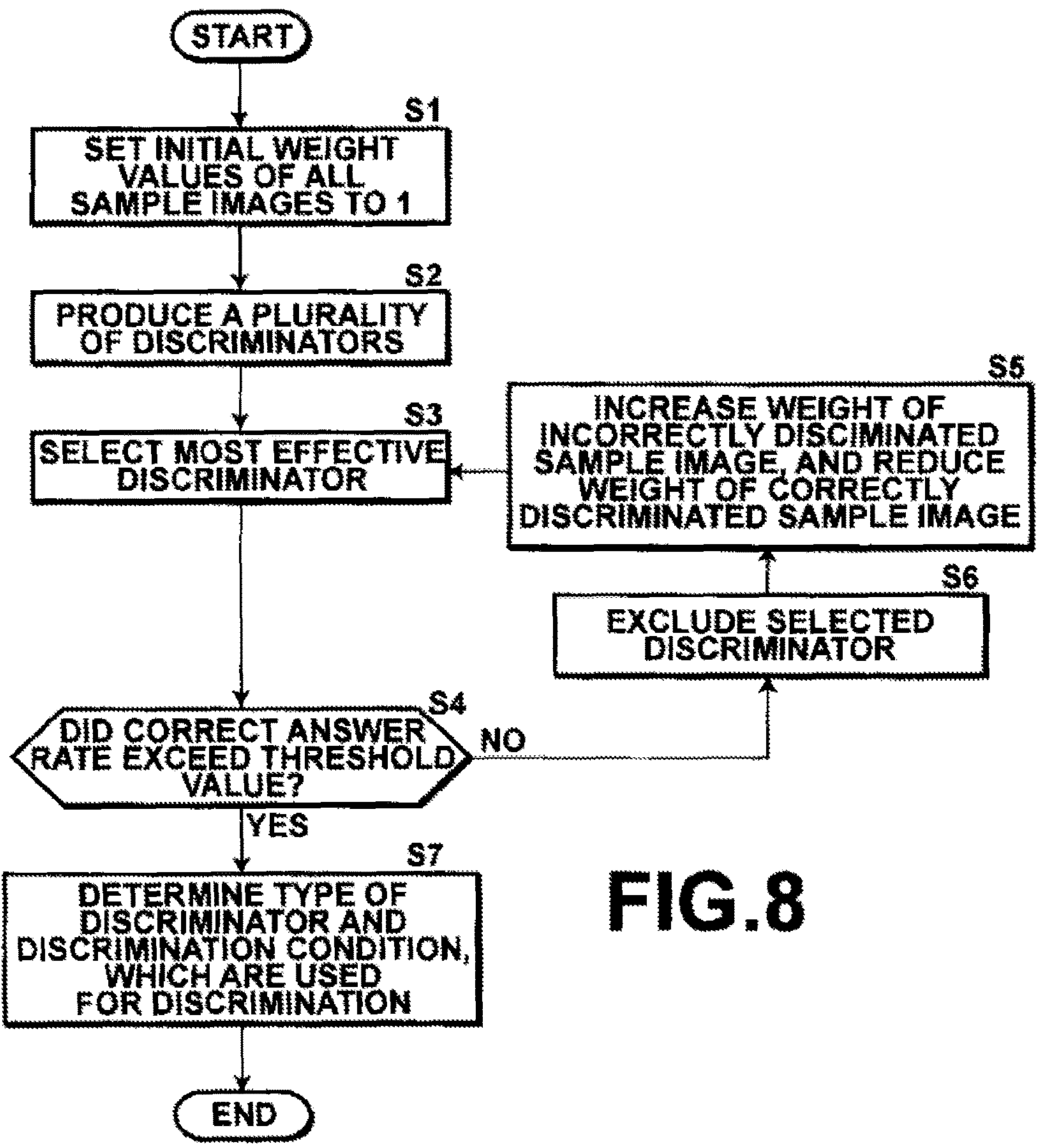
FIG.8

FIG.15A
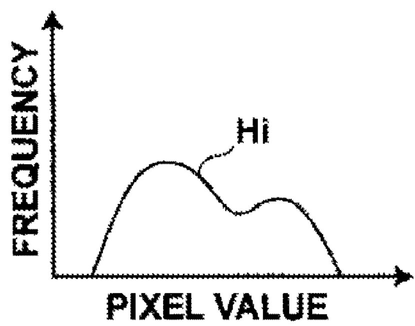
FIG.15B
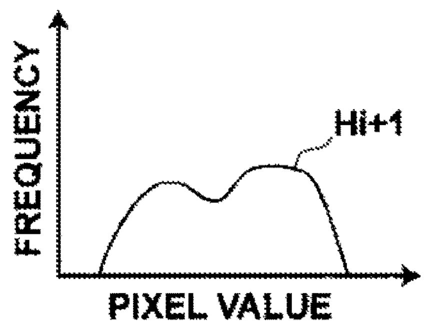
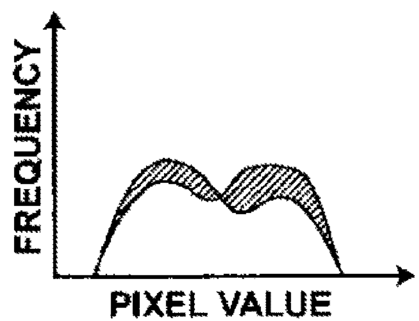
FIG.15C
FIG.16
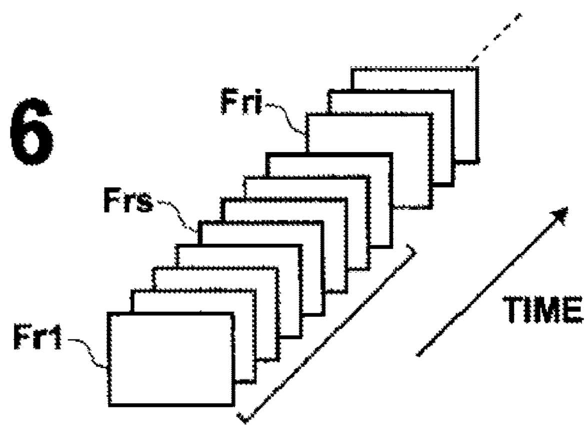

PHOTOGRAPHING APPARATUS, METHOD AND MEDIUM USING IMAGE RECOGNITION

This is a divisional of application Ser. No. 15/613,304, filed Jun. 5, 2017, which is a divisional of application Ser. No. 14/560,736, filed Dec. 4, 2014, now U.S. Pat. No. 9,712,742, which is a divisional of application Ser. No. 13/644,316, filed Oct. 4, 2012, now U.S. Pat. No. 8,948,470, which is a divisional of application Ser. No. 13/169,282, filed Jun. 27, 2011, now U.S. Pat. No. 8,306,285, which is a divisional of application Ser. No. 11/963,002, filed Dec. 21, 2007, now U.S. Pat. No. 7,991,200, which is a divisional of Ser. No. 11/037,069 filed Jan. 19, 2005, now U.S. Pat. No. 7,327,886, which claims priority to JP 2004-013112, filed Jan. 21, 2004, the contents of each of which is incorporated herein by reference in its entirety.

FIELD OF THE INVENTION

The present invention relates to a photographing apparatus, such as a digital camera, for obtaining image data by taking a photograph and storing the obtained image data in a storage means such as a memory card. The present invention also relates to a photographing method for the photographing apparatus and a program for causing a computer to execute the photographing method.

DESCRIPTION OF THE RELATED ART

Conventionally, when a photograph of a person is taken using a strobe (an electronic flash), there is a problem that the person's eyes glow red or gold in the photograph. This is a so-called red-eye phenomenon. The red-eye phenomenon occurs when strobe light passes through the pupils of the eyes, is reflected at the retinas of the eyes, and the reflected light is captured in a film.

Various systems for automatically detecting and correcting the red-eye as described above have been proposed. Particularly, various photographing apparatuses such as digital cameras have been proposed, which correct the red-eye in image data obtained with the digital cameras, by performing correction processing in the digital cameras, (for example, Japanese Unexamined Patent Publication No. 10(1998)-233929, Japanese Unexamined Patent Publication No. 11 (1999)-127371, and Japanese Unexamined Patent Publication No. 2000-305141).

However, red-eye correction processing requires detection of a human face in an image, represented by the image data, first, and further detection of the positions of the eyes in the detected face. The red-eye correction processing also requires correction processing for changing the color of the eyes from red to black. Since the digital cameras have much lower processing capacity than personal computers, a long time is required for the red-eye correction processing. Hence, there is a problem that the wait time becomes long until performing a next operation, such as displaying an obtained image on a liquid crystal monitor of a digital camera after photographing, or getting the digital camera ready to take a next photograph.

SUMMARY OF THE INVENTION

In view of the foregoing circumstances, it is an object of the present invention to reduce time for performing image processing on image data when predetermined image processing, such as red-eye correction processing, is performed on the image data in photographing apparatuses such as digital cameras.

A photographing apparatus according to the present invention is a photographing apparatus comprising:

a photographing means for obtaining image data by taking a photograph of a subject;

a display means for displaying various kinds of information including the image data;

a release means for performing photographing operation; a storage means for storing various kinds of information including the image data;

a photographing control means for obtaining a moving image of the subject by continuously taking photographs with the photographing means and displaying the moving image on the display means;

a face judgment means for performing processing, in a predetermined time interval, for judging whether a human face is included in a frame included in the moving image until a positive result is obtained in the judgment;

a face detection means for detecting a facial position in a frame, which is judged to include a face, if the face judgment means judges that the face is included in the frame; and a control means for controlling the photographing means, the face judgment means, the face detection means, and the storage means so that the detected facial position is stored in the storage means, judgment is made as to whether the face is included in the next frame after the predetermined time, and if the judgment is positive, the facial position is detected, the facial position, which is stored in the storage means, is replaced by the newly detected facial position and the newly detected facial position is stored in the storage means, and until the release means performs the photographing operation, judgment is made as to whether the face is included in the next frame further after the predetermined time, and if it is judged that the face is included in the frame, the facial position is detected, and the newly detected facial position is stored in the storage means, and a frame obtained when the release means performs the photographing operation and/or a plurality of temporally precedent and/or subsequent frames of the obtained frame are stored in the storage means as the image data.

When the photograph is taken with the photographing apparatus such as the digital camera, the moving image of the subject is displayed on the display means until photographing operation is performed by using the release means. The moving image includes 15 to 30 frames per second. Therefore, the "predetermined time" may be set in advance by determining the number of frames included in the predetermined time. For example, the predetermined time may be a time between two temporally adjacent frames, or a time including 5 or 10 frames.

The photographing apparatus according to the present invention may further include a variation judgment means for referring to the frame, which was judged to include the face, and its next frame, thereby judging whether the variation in an image between the two frames exceeds a predetermined value, and the control means may be a means for controlling the face judgment means so that if the variation judgment means judges that the variation is less than or equal to the predetermined value, the face judgment means performs processing, only on the region including the facial position stored in the storage means and the vicinity of the facial position, to judge whether the face is included in the next frame, and if the variation judgment means judges that the variation exceeds the predetermined value, the face judgment means performs processing on the whole region of the next frame, to judge whether the face is included in the next frame.

The clause "variation in an image between the two frames" refers to the variation, by which whether a scene has been switched between the two frames can be judged. Specifically, the absolute value of the difference in the average value of the pixel values between the two frames, the difference in the shapes of the histograms, or the like may be used as the variation. Here, if a scene is switched between the two frames, the variation in the image between the two frames is relatively large. If a scene is not switched between the two frames, the variation in the image between the two frames is not so large. Therefore, a value, based on which whether the scene has been switched can be discriminated, may be used as the "predetermined value". The "predetermined value" may be obtained experimentally by calculating the variation between two frames when the scene is actually switched between the two frames.

The photographing apparatus according to the present invention may further include an image processing means for performing predetermined image processing, related to a face, on the image data by referring to the facial position, stored in the storage means, after the photographing operation is performed.

The "predetermined image processing related to a face" may be any kind of processing as long as the processing is performed on a face, which has been detected in an image represented by image data. For example, the "predetermined image processing related a face" may be processing for improving the image quality of the face, such as at least one of red-eye correction processing, noise suppression processing on the face, density correction processing, and gradation correction processing. Alternatively, the "predetermined image processing related a face" may be processing for judging whether the eyes are closed in the detected face, and if the eyes are closed, selecting a frame including the face with open eyes from temporally preceding and/or subsequent frames of the frame, which was obtained when the photographing operation was performed. The "predetermined image processing related a face" may also be processing for judging whether the detected face is a smiling face, and if it is not a smiling face, selecting a frame including a smiling face from temporally preceding and/or subsequent frames of the frame, which was obtained when the photographing operation was performed.

A photographing method according to the present invention is a photographing method for a photographing apparatus including a photographing means for obtaining image data by taking a photograph of a subject, a display means for displaying various kinds of information including the image data, a release means for performing photographing operation, a storage means for storing various kinds of information including the image data, and a photographing control means for obtaining a moving image of the subject by continuously taking photographs with the photographing means and displaying the moving image on the display means, the method comprising the steps of:

performing processing, in a predetermined time interval, for judging whether a human face is included in a frame included in the moving image until a positive result is obtained in the judgment;

detecting a facial position in a frame, which is judged to include a face, if it is judged that the face is included in the frame; and storing the detected facial position in the storage means, judging whether the face is included in the next frame after the predetermined time, and if the judgment is positive, detecting the facial position, replacing the facial position, which is stored in the storage means, by the newly detected facial position and storing the newly detected facial position in the storage means, and until the release means performs the photographing operation, judging whether the face is included in the next frame further after the predetermined time, and if it is judged that the face is included in the frame, detecting the facial position, and storing the newly detected facial position in the storage means, and storing a frame, which is obtained when the release means performs the photographing operation, and a plurality of temporally precedent and/or subsequent frames of the obtained frame in the storage means as the image data.

The photographing method according to the present invention may be provided as a program for causing a computer to execute the photographing method.

According to the present invention, the moving image of the subject, which is obtained with the photographing apparatus, is displayed on the display means during photographing. Then, judgment is made, in a predetermined time interval, as to whether a human face is included in the frames forming the moving image until a positive result is obtained in the judgment. If it is judged that a face is included in a frame, the facial position is detected in the frame, which is judged to include the face, and the detected facial position is stored in the storage means.

Next, judgment is made as to whether a face is included in a temporally subsequent frame after the predetermined time. If the judgment is YES, the facial position is detected. The facial position, which is stored in the storage means, is replaced by the newly detected facial position, and the newly detected facial position is stored in the storage means. Then, until the release means performs photographing operation, judgment is made as to whether a face is included in the next frame after a predetermined time, and if it is judged that the face is included, the facial position is detected and the newly detected facial position is stored in the storage means. When the release means performs the photographing operation, the frame obtained by photographing and/or a plurality of temporally preceding and/or subsequent frames of the obtained frame are stored in the storage means as image data.

Here, when a photograph is taken, after the composition is determined, a few seconds are required before the release means is driven. In many cases, the subject does not move during the few seconds. Therefore, judgment is made, in a predetermined time interval, as to whether a face is included in the frame, and if it is judged that the face is included, the facial position is newly detected and stored in the storage means. Accordingly, the facial position, which is stored in the storage means, corresponds to the facial position included in the image represented by image data, which is obtained by the photographing operation. Hence, when predetermined image processing related to a face is performed on the image data obtained by photographing, face detection processing in the image, represented by the image data, is not required. Accordingly, time required for the image processing can be reduced. Further, the wait time until displaying the image data obtained by photographing on the display means, or time until getting the photographing apparatus ready to take a photograph of the next image can be reduced. Consequently, a photographer can be relieved from stress, which he/she will feel if the wait time is long.

Further, the frame, which is judged to include a face, and its next frame are referred to, and judgment is made as to whether the variation in the image between the two frames exceeds a predetermined value. If the variation is less than or equal to the predetermined value, judgment is made as to whether a face is included in the next frame by performing processing only on the region of the next frame, including the facial position stored in the storage means and the vicinity of the facial position. Accordingly, if the scene is not switched between the two frames, it is not required to perform the judgment processing on the whole region of the next frame as to whether the face is included. Therefore, processing time for judging whether a face is included can be reduced.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2A is a diagrams illustrating an edge detection filter in a horizontal direction;

FIG. 2B is a diagram illustrating an edge detection filter in a vertical direction;

FIG. 3 is a diagram for explaining calculation of gradient vectors;

FIG. 4A is a diagram illustrating a human face;

FIG. 4B is a diagram illustrating gradient vectors in the vicinity of the eyes and the mouth of the human face, which is illustrated in FIG. 4A;

FIG. 7A is a diagram for explaining rotation of a face;

FIG. 7B is a diagram for explaining rotation of the face;

FIG. 7C is a diagram for explaining rotation of the face;

FIG. 8 is a flow chart illustrating learning method of references data;

FIG. 15A is a diagram for explaining processing for obtaining the difference in shape between histogram as the variation;

FIG. 15B is a diagram for explaining processing for obtaining the difference in shape between histograms as the variation;

FIG. 15C is a diagram for explaining processing for obtaining the difference in shape between histograms as the variation; and FIG. 16 is a diagram for explaining processing for obtaining temporally preceding and/or subsequent frames of a frame, obtained by photographing operation, as image data.

DESCRIPTION OF THE PREFERRED EMBODIMENTS

Figure 1:
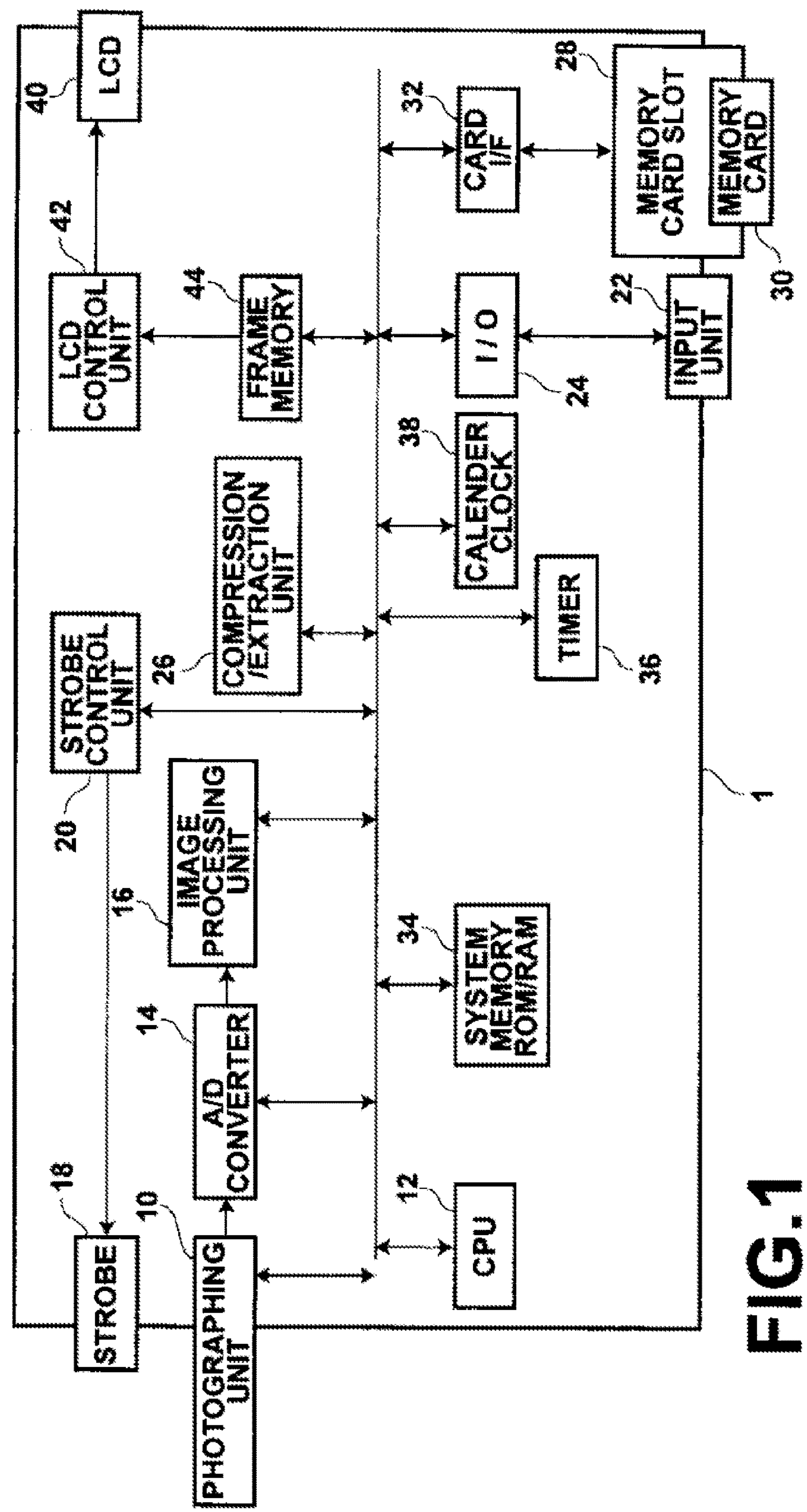
FIG. 1 is a schematic block diagram illustrating the configuration of a digital camera, which is an embodiment of a photographing apparatus according to the present invention.

Hereinafter, embodiments of the present invention will be described with reference to the attached drawings. FIG. 1 is a schematic block diagram illustrating the configuration of a digital camera, which is an embodiment of a photographing apparatus according to the present invention. As illustrated in FIG. 1, a digital camera 1 includes a photographing unit 10 for forming an image of a subject on a light receiving plane, performing photo-electric conversion on the image, and outputting the image as image data. The digital camera 1 also includes a CPU (central processing unit) 12 for controlling the whole digital camera 1 and performing various kinds of control such as image data sampling timing control, image data recording control, and image data display control. The digital camera 1 also includes an A/D converter 14 for converting analog image data into digital image data. The digital camera 1 also includes an image processing unit 16 for performing image processing such as image resizing, red-eye correction, sharpness correction, gamma correction, contrast correction, and white balance correction. The digital camera 1 also includes a strobe 18, and a strobe control unit 20 for controlling the operation of the strobe 18. The digital camera 1 also includes an input unit 22, used by a user, who is a photographer, when he/she inputs various kinds of information to the digital camera 1. The input unit 22 includes a release button for performing photographing operation and a mode switch for switching the mode of the digital camera 1, such as a photography mode. The digital camera 1 also includes an I/O 24, which is an interface for receiving various kinds of information input at the input unit 22.

Further, the digital camera 1 also includes a compression/extraction unit 26 for compressing the image data by using a technique typified by JPEG (Joint Photographic Experts Group) or motion-JPEG compression, and extracting the compressed image data. The digital camera 1 also includes a card interface 32 for converting the image data so that the image data is recorded on a memory card 30, which is mounted in a memory card slot 28 in a detachable manner, and read out from the memory card 30. The memory card 30 is a detachable recording medium typified by a semiconductor memory medium, a magnetic recording medium and a photo recording medium.

Further, the digital camera 1 includes a system memory 34 including a ROM (Read-Only Memory) and a RAM (Random Access Memory). Operation programs of the CPU 12, including programs for performing various kinds of processing, and each constant are stored in the ROM. The various kinds of processing are processing for judging whether a face is included in an image represented by image data as described later, and if the judgment is YES, processing for detecting the facial position, and processing for storing the facial position. The RAM is a storage means, which functions as a work area during execution of the programs. The digital camera 1 also includes a timer 36, which is driven during timer photography, and a calendar clock 38 for keeping current time. The digital camera 1 also includes an LCD (Liquid Crystal Display) 40 for displaying various kinds of information such as image data and an LCD control unit 42 for performing D/A conversion or the like for displaying the image data on the LCD 40. The digital camera 1 also includes a frame memory 44 including a VRAM (Video Random Access Memory) or the like, for temporarily storing the image data, which will be displayed by an instruction from the CPU 12. When a photography mode of taking a photograph of the subject by pressing the release button is set, image data of 30 frames per second is input to the frame memory 44. Accordingly, a moving image of the subject is displayed on the LCD 40 during photography. Further, if a user presses the release button to perform a photographing operation while the moving image is displayed on the LCD 40, the CPU 12 performs red-eye correction processing on image data, which was obtained when the photographing operation was performed, and displays the processed image data on the LCD 40. The CPU 12 also records the processed image data on the memory card 30.

Then, the CPU 12 reads out the programs for executing processing for judging whether a face is included in the image, processing for detecting the facial position, or the like from the system memory 34, and executes the program. Accordingly, the CPU 12 functions as a photographing control means, a face judgment means, a face detection means, a control means, and a variation judgment means.

When the photography mode is set, the CPU 12 executes a program for judging whether a face is included in the image by performing face discrimination processing on a single frame included in the moving image, as described below. Accordingly, the CPU 12 judges whether a face is included in the single frame.

The CPU 12 calculates a first characteristic value C1, which is used for discriminating the face, from a single frame Fri. The CPU 12 also calculates a second characteristic value C2 from an image within a facial candidate, extracted from the frame Fri as described later. Specifically, the directions of gradient vectors in the frame Fri are calculated as the first characteristic value C1. Gradient vectors (namely directions and magnitudes) of the image within the facial candidate are calculated as the second characteristic value C2. The calculation of the gradient vectors will be described. First, the CPU 12 performs filtering processing on the frame Fri by using an edge detection filter in a horizontal direction, as illustrated in FIG. 2A, and detects an edge in the frame Fri in the horizontal direction. The CPU 12 also performs filtering processing on the frame Fri by using an edge detection filter in a vertical direction, as illustrated in FIG. 2B, and detects an edge in the frame Fri in the vertical direction. Then, the CPU 12 calculates a gradient vector K at each pixel based on the magnitude H of the edge in the horizontal direction and the magnitude V of the edge in the vertical direction at each pixel of the frame Fri, as illustrated in FIG. 3.

Then, the direction of the vector K is obtained as the first characteristic value C1. Specifically, the first characteristic value C1 is represented by a value of 0 to 359 degrees with respect to a predetermined direction (x direction in FIG. 3, for example) of the gradient vector K.

When the image is a human face as illustrated in FIG. 4A, in a dark area such as eyes and a mouth, the gradient vectors K calculated as described above are directed to the center of each of the eyes and the mouth, as illustrated in FIG. 4B. In a bright area such as a nose, the gradient vectors K are directed outside from the position of the nose, as illustrated in FIG. 4B. Further, since the density change at the eyes is larger than the density change at the mouth, the magnitudes of the gradient vectors K at the eyes are larger than the magnitudes of the gradient vectors K at the mouth.

Figure 5A:
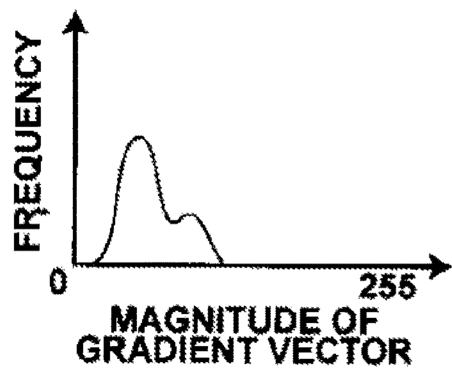
FIG. 5A is a histogram of the magnitude of the gradient vectors before normalization.
Figure 5B:
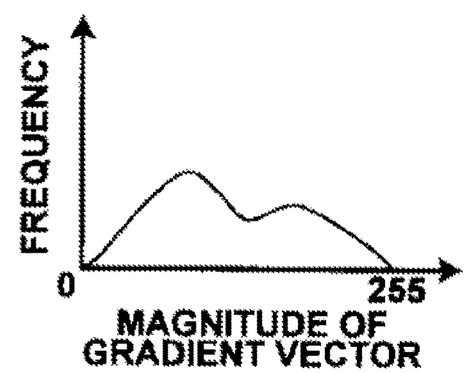
FIG. 5B is a histogram of the magnitude of the gradient vectors after normalization.
Figure 5C:
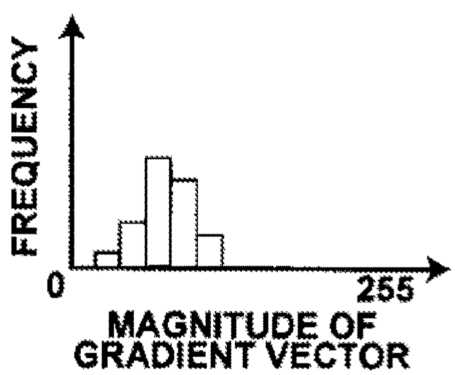
FIG. 5C is a histogram of the quinarized magnitude of the gradient vectors.
Figure 5D:
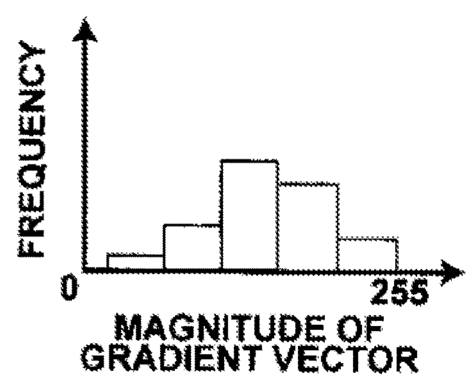
FIG. 5D is a histogram of the quinarized magnitude of the gradient vectors after normalization.

Here, the second characteristic value C2 is calculated only for the region within the facial candidate. Further, the magnitude of the gradient vector K of the second characteristic value C2 is normalized. This normalization is performed by obtaining a histogram of the magnitudes of the gradient vectors K at all pixels in the facial candidate. The histogram is smoothed so that the magnitudes of the gradient vectors K are evenly distributed to all the range of values, which may represent the magnitude of the gradient vector K at each pixel in the facial candidate (0 to 255 in the case of 8 bits). For example, when the magnitudes of the gradient vectors K are small, and the magnitudes of the gradient vectors K are concentrated in the lower value side of the histogram, as illustrated in FIG. 5A, the magnitudes of the gradient vectors K are normalized so that they are distributed over the whole range of 0 to 255. Accordingly, the magnitudes of the gradient vectors K become distributed in the histogram as illustrated in FIG. 5B. For reducing the operation amount, it is preferable that the distribution range of the histogram of the gradient vectors K is divided into five as illustrated in FIG. 5C, for example, and the frequency distribution is normalized so that the frequency distributions, which are divided into five, are spread to all the range of values from 0 to 255, which are divided into five, as illustrated in FIG. 5D.

Here, when a photograph is taken by using the digital camera 1, the brightness of lighting and the direction of lighting differ according to photographing conditions. Therefore, the brightness and direction of lighting in each frame Fri is different. If the gradient vectors K in each of the frames Fri, which are obtained with different brightness and direction of lighting, are calculated in a same manner, even if the image in each of the frames Fri is a face, the calculated magnitudes of the gradient vectors at the positions of the eyes are different in each of the frames. Therefore, it is impossible to accurately discriminate whether the facial candidate is a face. In this case, the magnitudes of the gradient vectors K may be normalized for the whole region of the frame. However, since the operation amount of the normalization is large, normalization processing requires long time. Therefore, in the present embodiment, the second characteristic value is normalized by performing processing only on the facial candidate instead of the whole frame Fri. Accordingly, the operation amount is reduced, and the processing time is shortened.

The CPU 12 calculates the first characteristic value C1 and the second characteristic value C2 at each stage of deformation of the frame Fri and the facial candidate, as described later.

First reference data R1 and second reference data T2 for discriminating a face is stored in the system memory 34. The first reference data R1 defines a discrimination condition for the combination of the first characteristic value C1 at each pixel included in each of a plurality of kinds of pixel groups including a plurality of pixels, selected from a sample image as described later. The second reference data R2 defines a discrimination condition for the combination of the second characteristic value C2 at each pixel included in each of a plurality of kinds of pixel groups including a plurality of pixels, selected from a sample image.

The combination of the first characteristic values C1 and the discrimination condition at each pixel, included in each pixel group in the first second reference data R1 are determined in advance. The combination of the second characteristic values C2 and the discrimination condition at each pixel, included in each pixel group, in the second reference data R2 are also determined in advance. The combination of the characteristic values C1 and C2 and the discrimination conditions are obtained by learning using a sample image group, including a plurality of sample images, which are recognized as facial images, and a plurality of sample images, which are recognized as non-facial images.

Figure 6:
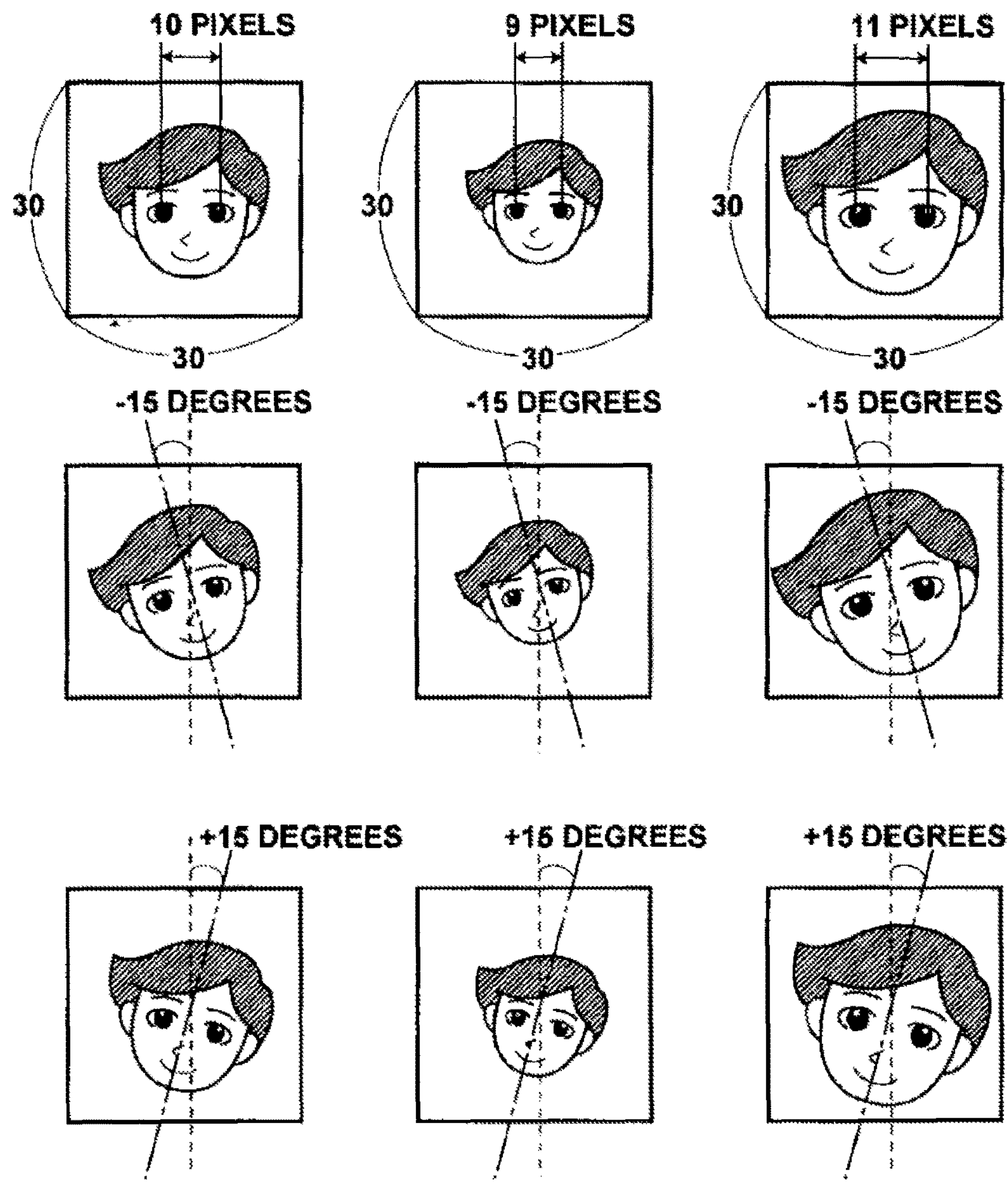
FIG. 6 shows a diagram illustrating examples of sample images, which are recognized as faces.

In the present embodiment, it is assumed that sample images, which have a size of 30×30 pixels, are used as the sample images, which are recognized as facial images. It is also assumed that the sample images as illustrated in FIG. 6 are used for a single facial image. In the sample images, the distances between the centers of both eyes are 10 pixels, 9 pixels and 11 pixels, and the face is rotated from a standard vertical position on a plane in 3 degree increments in a stepwise manner within the range of ±15 degrees (namely, the rotation angles are −15 degrees, −12 degrees, −9 degrees, −6 degrees, −3 degrees, 0 degrees, 3 degrees, 6 degrees, 9 degrees, 12 degrees, and 15 degrees). Therefore, 3×11=33 sample images are prepared for a single facial image. Here, the positions of the eyes in each of the sample images are the same in the vertical direction when the face is vertically positioned. In FIG. 6, only samples image, which are rotated −15 degrees, 0 degrees and +15 degrees are illustrated. Further, the center of the rotation is the intersection of diagonal lines in the sample images. It is assumed that, arbitrary images, which have the size of 30×30 pixels, are used as the sample images, which are recognized as non-facial images.

Here, if learning is performed by using only a sample image, in which the distance between the centers of both eyes is 10 pixels and the rotation angle on a plane is 0 degrees (namely, the face is vertical, as a sample image, which is recognized as a facial image, the face is discriminated as the facial candidate or the face with reference to the first reference data R1 and the second reference data R2 only in the case the distance between the centers of both eyes is 10 pixels and the face is not rotated at all. The sizes of faces, which may be included in the frame Fri, are not the same. Therefore, for discriminating whether a facial candidate is included in the frame Fri or whether the facial candidate is a face, the frame Fri is enlarged or reduced as described later so that a face, of which the size conforms to the size of the sample image, can be discriminated. However, for accurately changing the distance between the centers of both eyes to 10 pixels, the size of the frame Fri is required to be enlarged or reduced in a stepwise manner by changing the enlargement ratio of the size of the frame Fri in 1.1 units, for example, during discrimination. Therefore, the operation amount becomes huge.

Further, the frame Fri may include rotated faces as illustrated in FIGS. 7B and 7C as well as a face, of which rotation angle on a plane is 0 degree, as illustrated in FIG. 7A. However, if only sample images, in which the distance between the centers of the eyes is 10 pixels and the rotation angle of the face is 0 degree, are used for learning, although rotated faces are faces, the rotated faces as illustrated in FIGS. 7B and 7C may not be discriminated.

Therefore, in the present embodiment, the sample images as illustrated in FIG. 6 are used as the sample images, which are recognized as facial images. In FIG. 6, the distances between the centers of both eyes are 9 pixels, 10 pixels or 11 pixels, and the face is rotated on a plane in 3 degree increments in a stepwise manner within the range of ±15 degrees for each of the distances between the centers of both eyes. Accordingly, the allowable range of the reference data R1 and R2, which are obtained by learning, becomes wide. Accordingly, the frame Fri may be enlarged or reduced in a stepwise manner by changing the enlargement ratio in 11/9 units. Therefore, the operation time can be reduced in comparison with the case of enlarging or reducing the size of the frame Fri in a stepwise manner by changing the enlargement ratio in 1.1 units, for example. Further, the rotated faces as illustrated in FIGS. 7B and 7C may also be discriminated.

An example of a learning method by using a sample image group will be described below with reference to a flow chart illustrated in FIG. 8. Here, learning of the second reference data R2 will be described.

The sample image group, which is a learning object, includes a plurality of sample images, which are recognized as facial images, and a plurality of sample images, which are recognized as non-facial images. For each sample image, which is recognized as the facial image, images, of which distances between the centers of both eyes are 9 pixels, 10 pixels or 11 pixels, are used. Further, the face in each of the images is rotated on a plane in 3 degree increments in a stepwise manner within the range of ±15 degrees. Weight, namely the degree of importance, is assigned to each of the sample images. First, an initial weight value is equally set to 1 for all of the sample images (step S1).

Next, a discriminator is generated for each of a plurality of kinds of pixel groups in the sample images (step S2). Here, each discriminator provides criteria for discriminating a facial image from a non-facial image by using the combination of the second characteristic value C2 at each pixel, which forms a single pixel group. In the present embodiment, a histogram of the combination of the second characteristic value C2 at each pixel, which forms the single pixel group, is used as the discriminator.

Figure 9:
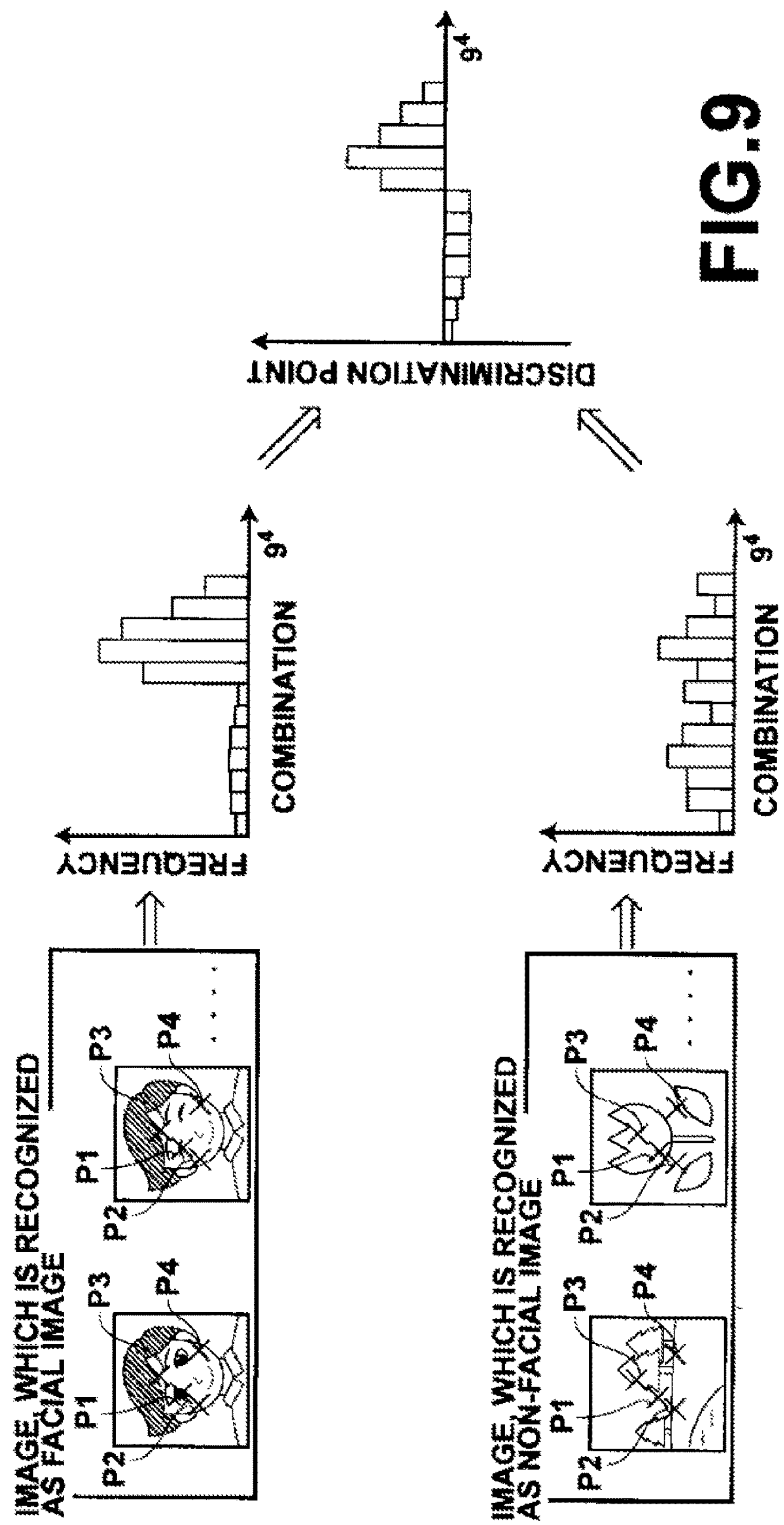
FIG. 9 is a diagram illustrating a method for obtaining a discriminator.

Generation of the discriminator will be described below with reference to FIG. 9. As illustrated in the sample images in the left side of FIG. 9, a pixel group for generating the discriminator includes a pixel P1 at the center of the right eye, a pixel P2 in the right cheek, a pixel P3 in the forehead and a pixel P4 in the left cheek in each of a plurality of sample images, which are recognized as facial images. Then, the combinations of the second characteristic values C2 at all of the pixels P1-P4 are obtained for all of the sample images, which are recognized as facial images, and a histogram of the combinations of the characteristic values is generated. Here, the second characteristic value C2 represents the direction and magnitude of the gradient vector K. The direction of the gradient vector K can be represented by 360 values of 0 to 359, and the magnitude of the gradient vector K can be represented by 256 values of 0 to 255. Therefore, if all the values, which represent the direction, and the values, which represent the magnitude, are used, the number of combinations is 360×256 for a pixel, and the number of combinations is $(360\times256)^4$ for the four-pixels. Therefore, a huge number of samples, long time and a large memory are required for learning and detecting. Therefore, in the present embodiment, the values of the directions of the gradient vectors, which are from 0 to 359, are quarternarized. The values from 0 to 44 and from 315 to 359 (right direction) are represented by the value of 0, the values from 45 to 134 (upper direction) are represented by the value of 1, the values from 135 to 224 (left direction) are represented by the value of 2, and the values from 225 to 314 (lower direction) are represented by the value of 3. The values of the magnitudes of the gradient vectors are ternarized (values: 0 to 2). The value of combination is calculated by using the following equations:

$$\text{Value of Combination} = 0$$

$$(\text{if Magnitude of Gradient Vector} = 0),$$

$$\text{Value of Combination} =$$

$$(\text{Direction of Gradient Vector} + 1) \times \text{Magnitude of Gradient Vector}$$

$$(\text{if Magnitude of Gradient Vector} > 0).$$

Accordingly, the number of combinations becomes $9^4$. Therefore, the number of sets of data of the second characteristic values C0 can be reduced.

A histogram about the plurality of sample images, which are recognized as non-facial images, is also generated in a similar manner. For generating the histogram about the sample images, which are recognized as non-facial images, pixels (similar reference numerals P1-P4 are used) corresponding to the positions of the pixels P1-P4 in the sample images, which are recognized as facial images, are used. The logarithmic value of the ratio between the frequency values represented by the two histograms is calculated. The calculated values are represented in a histogram illustrated in the extreme right side of FIG. 9. This histogram is used as the discriminator. Each value on the vertical axis of this histogram, which is the discriminator, is hereinafter referred to as a discrimination point. According to this discriminator, if the distribution of the second characteristic value C2 corresponds to positive discrimination points, the possibility that the image is a facial image is high. If the absolute value of the discrimination point is larger, the possibility is higher. In contrast, if the distribution of the characteristic value C2 of an image corresponds to negative discrimination points, the possibility that the image is a non-facial image is high. If the absolute value of the discrimination point is larger, the possibility is higher. In step S2, a plurality of discriminators, in the form of histograms as described above, is generated for the combination of the characteristic value C2 at each pixel included in a plurality of kinds of pixel groups, which may be used for discrimination.

Then, the most effective discriminator for discriminating whether the image is a facial image is selected from the plurality of discriminators, which were generated in step S2. Weight of each sample image is considered to select the most effective discriminator. In this example, a weighted correct answer rate of each discriminator is compared with each other, and a discriminator, of which weighted correct answer rate is the highest, is selected as the most effective discriminator (step S3). Specifically, in the first step S3, the weight of each sample image is equally 1. Therefore, a discriminator, which can correctly discriminate whether an image is a facial image regarding a largest number of sample images, is simply selected as the most effective discriminator. Meanwhile, in the second step S3 after the weight of each sample image is updated in step S5, which will be described later, there are sample images, of which weight is 1, sample images, of which weight is larger than 1, and sample images, of which weight is smaller than 1. Therefore, when the correct answer rate is evaluated, the sample image, of which weight is larger than 1, is counted more heavily than the sample image, of which weight is 1. Accordingly, in the second or later step S3, processing is focused on correctly discriminating a sample image, of which weight is large, than correctly discriminating a sample image, of which weight is small.

Next, processing is performed to check whether the correct answer rate of the combination of the discriminators, which have been selected so far, exceeds a predetermined threshold value (step S4). The correct answer rate of the combination of the discriminators is the rate that the discrimination result as to whether each sample image is a facial image by using the combination of the discriminators, which have been selected so far, is the same as the actual answer as to whether the image is a facial image. Here, either the present sample image group after weighting or an equally weighted sample image group may be used to evaluate the correct answer rate of the combination. If the rate exceeds the predetermined threshold value, the probability of discriminating whether the image is a facial image by using the discriminators, which have been selected so far, is sufficiently high. Therefore, learning ends. If the rate is not higher than the predetermined threshold value, processing goes to step S6 to select an additional discriminator, which will be used in combination with the discriminators, which have been selected so far.

In step S6, the discriminator, which was selected in the most recent step S3, is excluded so as to avoid selecting the same discriminator again.

Next, if a sample Image is not correctly discriminated as to whether the image is a facial image by using the discriminator, which was selected in the most recent step S3, the weight of the sample image is increased. If a sample image is correctly discriminated as to whether the image is a facial image, the weight of the sample image is reduced (step S5). The weight is increased or reduced as described above to improve the effects of the combination of the discriminators. When the next discriminator is selected, the selection is focused on the images, which could not be correctly discriminated by using the discriminators, which have been already selected. A discriminator, which can correctly discriminate the images as to whether they are facial images, is selected as the next discriminator.

Then, processing goes back to step S3, and the next most effective discriminator is selected based on the weighted correct answer rate as described above.

Processing in steps S3-S6 as described above is repeated. When a discriminator, which corresponds to the combination of the characteristic value C2 at each pixel forming a specific pixel group, is selected as an appropriate discriminator for discriminating whether an image includes a face, if the correct answer rate of the combination, which is checked in step S4, exceeds a threshold value, the type of the discriminator, which will be used for discriminating whether a face is included, and the discrimination condition are determined (step S7). Accordingly, learning of the second reference data B2 ends.

Then, learning of the first reference data R1 is performed by obtaining the type of the discriminator and the discrimination condition in a similar manner to the method as described above.

When the learning method as described above is adopted, the discriminator is not limited to the discriminator of the histogram type as described above. The discriminator may be in any form as far as it can provide criteria for discriminating a facial image from a non-facial image by using the combination of the first characteristic value C1 and the second characteristic value C2 at each pixel, which forms a specific pixel group. For example, the discriminator may be binary data, a threshold value, a function, or the like. Further, other kinds of histograms such as a histogram showing the difference value between the two histograms, which are illustrated at the center of FIG. 9, may also be used.

Further, the learning method is not limited to the method as described above. Other machine learning methods such as a neural network method may also be used. The first reference data R1 and the second reference data R2 may be data empirically determined by a skilled technician.

The CPU 12 refers to the discrimination conditions, which were learned by the first reference data R1 about all of the combinations of the first characteristic value C1 at each pixel, which forms a plurality of kinds of pixel groups. Then, the CPU 12 obtains a discrimination point for the combination of the first characteristic value C1 at each pixel, which forms each pixel group. The CPU 12 discriminates whether a face is included in the frame Fri by using all of the discrimination points. At this time, the direction of the gradient vector K, which is a first characteristic value C1, is quaternarized, for example, in the same manner as learning of the first reference data R1. In the present embodiment, all the discrimination points are added, and discrimination is carried out based on whether the sum is a positive value or a negative value. For example, if the sum of the discrimination points is a positive value, it is judged that the frame Fri includes a facial candidate. If the sum of the discrimination points is a negative value, it is judged that the frame Fri does not include a facial candidate. The processing, which is performed by the CPU 12, for discriminating whether the frame Fri includes a facial candidate is referred to as first discrimination.

Figure 10:
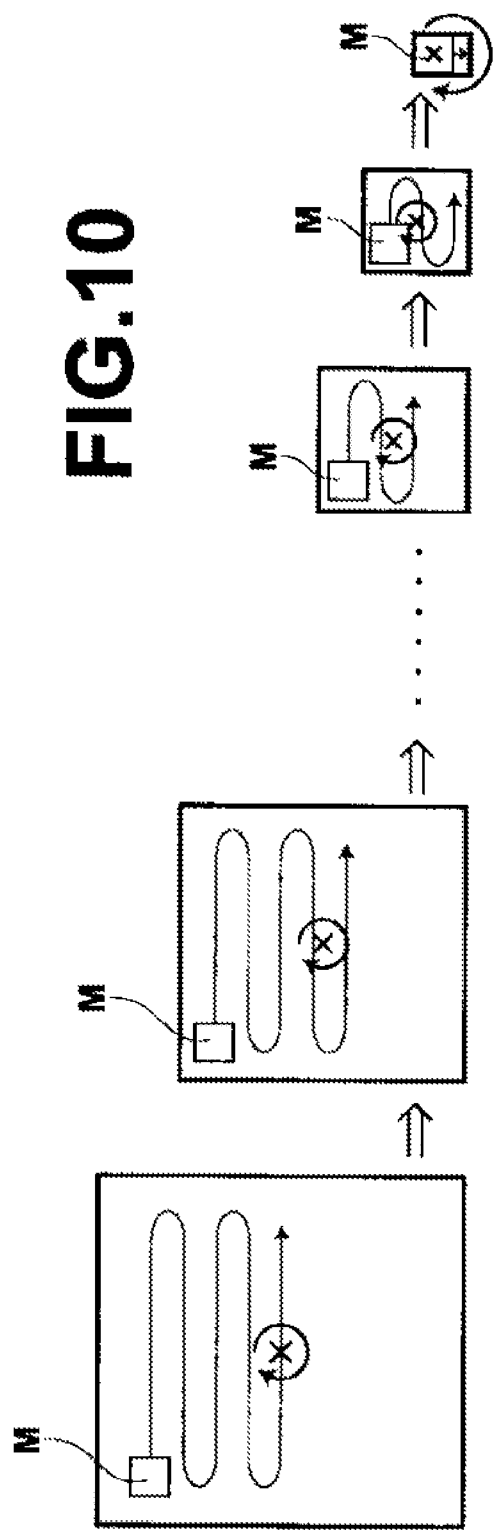
FIG. 10 is a diagram for explaining stepwide deformation of of a frame.

Here, unlike the sample image, which has the size of 30×30 pixels, the frame Fri has various sizes. Further, when a face is included in the frame Fri, the rotation angle of the face on a plane is not always 0 degree. Therefore, the CPU 12 enlarges or reduces the frame Fri in a stepwise manner so that the size of the frame Fri in the longitudinal direction or the lateral direction becomes 30 pixels, as illustrated in FIG. 10. At the same time, the CPU 12 rotates the frame Fri on the plane 360 degrees in a stepwise manner. (FIG. 10 illustrates the reduction state.) A mask M, which has the size of 30×30 pixels, is set on the enlarged or reduced frame Fri at each stage of deformation. Further, the mask M is moved pixel by pixel on the enlarged or reduced frame Fri, and processing is performed to discriminate whether the image in the mask M is a facial image. Accordingly, the CPU 12 discriminates whether the frame Fri includes a facial candidate.

During generation of the first reference data R1 and the second reference data R2, the sample images, in which the distance between the centers of both eyes is 9 pixels, 10 pixels or 11 pixels, were used for learning. Therefore, the enlargement rate during enlargement or reduction of the frame Fri and the facial candidate may be 11/9. Further, the sample images, which were used for learning during generation of the first and second reference data R1 and R2, are images, in which a face is rotated on a plane within the range of ±15 degrees. Therefore, the frame Fri and the facial candidate may be rotated in 30 degree increments in a stepwise manner ever 360 degrees.

The CPU 12 calculates the first characteristic value C1 and the second characteristic value C2 at each stage of deformation such as enlargement or reduction and rotation of the frame Fri and the facial candidate.

Then, the CPU 12 discriminates whether a facial candidate is included in the frame Fri at each stage of enlargement or reduction and rotation of the frame Fri. If it is judged even once that a facial candidate is included in the frame Fri, the CPU 12 judges that a facial candidate is included in the frame Fri. The CPU 12 extracts a region of 30×30 pixels, which corresponds to the position of the mask M, at which it was discriminated that a facial candidate was included in the mask M, as a facial candidate, from the frame Fri, which has the size and rotation angle at the stage when it was discriminated that the facial candidate was included.

Further, the CPU 12 deforms the extracted facial candidate in a same manner with the deformation as described above by enlarging or reducing the facial candidate in a stepwise manner. The CPU 12 refers to the discrimination conditions, which were learned by the second reference data R2 about all of the combinations of the characteristic value C2 at each pixel, which forms a plurality of kinds of pixel groups in the extracted facial candidate. The CPU 12 obtains a discrimination point about the combination of the characteristic value C2 at each pixel, which forms each pixel group, at each stage of deformation. Then, the CPU 12 discriminates whether the facial candidate is a face by using all of the discrimination points. At this time, the direction of the gradient vector K, which is the second characteristic value C2, is quarternarized, and the magnitude of the gradient vector K, which is the second characteristic value C2, is ternarized. In the present embodiment, it is assumed that all the discrimination points are added, and discrimination is performed by judging whether the addition value is positive or negative. For example, if the summation of the discrimination points is a positive value, it is judged that the facial candidate is a face. If the summation of the discrimination points is a negative value, it is judged that the facial candidate is not a face. The processing for discriminating whether the facial candidate is a face is referred to as second discrimination.

If it is judged that a facial candidate is not included in the frame Fri in the first discrimination, or even if it is judged that a facial candidate is included in the frame Fri in the first distinction, if it is judged that the facial candidate is not a face in the second discrimination, the CPU 12 judges that a face is not included in the frame Fri. In this case, the CPU 12 performs the first and second discrimination on a frame Fri+1 after predetermined time (for example after 10 frames) to judge whether a face is included in the frame Fri+1 in a similar manner to the discrimination as described above.

If the facial candidate, which was discriminated in the first discrimination, is discriminated as a face in the second discrimination, it is judged that a face is included in the frame Fri. When it is judged that the face is included in the frame Fri, the coordinate values at four corners of the region of 30×30 pixels, which corresponds to the position of the mask M, at which it was discriminated that the face was included, are obtained. Here, since the frame Fri was enlarged or reduced during discrimination of the face, the facial position is detected by obtaining four coordinate values in the frame Fri of an original size, corresponding to the coordinate values at four corners of the region of 30×30 pixels. The obtained facial position is stored in the system memory 34 as information Pi, which represents the facial position. Therefore, in the present embodiment, the information Pi, which represents the facial position, is the coordinate values at four corners of a rectangle enclosing the face included in the frame Fri. The information Pi, which represents the facial position, is not limited the coordinate values as described above. The center position, which is the coordinate of the intersection of the diagonal lines of the mask M, and the length of the radius of a circle with its center at the center position may also be used as the information Pi, which represents the facial position.

After the CPU 12 stores the information Pi, which represents the facial position, in the system memory 34, the CPU 12 also calculates the variation of the image from the frame Fri to the frame Fri+1 after predetermined time (after 10 frames, for example). Specifically, the CPU 12 adds the pixel values of all the pixels in each of the frame Fri and the frame Fri+1, and divides the obtained addition values with the total number of pixels in each of the frame Fri and the frame Fri+1, respectively. Accordingly, the average values (hereinafter referred to as Mi and Mi+1) of the pixel values are calculated for the frame Fri and the frame Fri−1, respectively. Then, the absolute value |ΔM| of the difference between the average value Mi and the average value Mi+1 is calculated as the variation. Then, the CPU 12 judges whether the variation |ΔM| has exceeded a predetermined threshold value Th1.

Here, if a scene has been switched between the two frames of the frame Fri and the frame Fri+1, the variation |ΔM| of the image between the two frames is relatively large. If a scene has not been switched, the variation |ΔM| of the image between the two frames is not so large. Therefore, a value, which is sufficient for discriminating whether the scene has been switched, may be used as the threshold value Th1. The threshold value Th1 may be empirically obtained by calculating the variation between two frames when the scene is actually switched.

Figure 11:
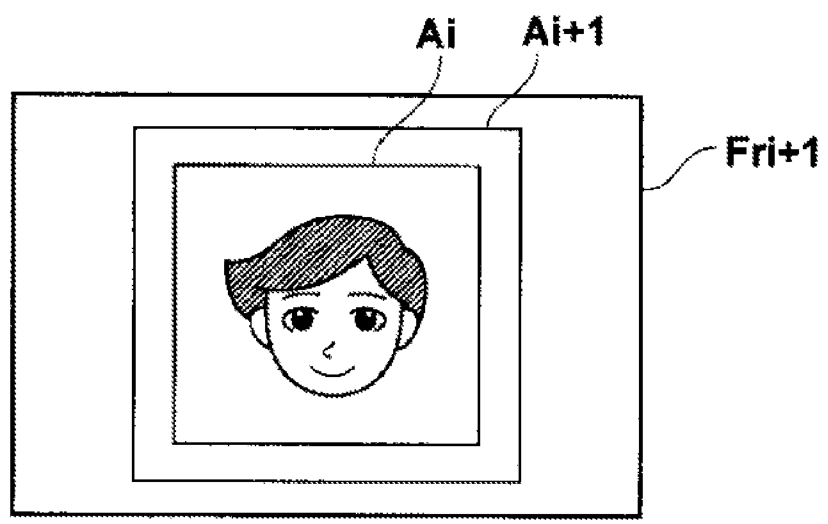
FIG. 11 is a diagram for explaining regions, on which processing is performed to judge whether a face is included, when the variation is less than or equal to a threshold value.

If the variation |ΔM| is less than or equal to the threshold value Th1, it is judged that the scene is not switched between the two frames of the frame Fri and the frame Fri+1. Then, the CPU 12 reads out the information Pi about the facial position, stored in the system memory 34. Regarding the frame Fri+1, the CPU 12 performs judgment processing, only on the facial position detected in the frame Fri and the vicinity of the facial position, to judge whether a face is included in the frame Fri+1. Specifically, as illustrated in FIG. 11, since the information Pi about the facial position is the coordinate values at four corners of the rectangle enclosing the face included in the frame Fri, judgment is made as to whether a face is included in a rectangular region Ai+1, which has the size of approximately 1.2 times of the size of the rectangular region Ai, with the rectangular region Ai at the center of the rectangular region Ai+1. In the processing for judging whether a face is included in the frame Ai+1, both of the first distinction and the second distinction may be performed. Alternatively, only the second distinction may be performed.

Then, when the CPU 12 judges that a face is included in the frames Fri+1, the CPU 12 obtains information Pi+1, which represents the facial position, in a similar manner to the obtainment of the information about the frame Fri. The information Pi, which represents the facial position, is replaced by the information Pi+1, and the information Pi+1 is stored in the system memory 34.

If the variation |ΔM| exceeds the threshold value Th1, it is judged that the scene is switched between the two frames of the frame Fri and the frame Fri+1. Then, the CPU 12 performs judgment processing, on the whole frame Fri+1, to judge whether a face is included in the frame Fri+1 in a similar manner to the judgment as described above. Further, when the variation |ΔM| is less than or equal to the threshold value Th1, if it is not judged that a face is included, it is judged that the scene is switched between the two frames of the frame Fri and the frame Fri+1. The CPU 12 performs judgment processing, on the whole frame Fri+1, to judge whether a face is included in a similar manner to the judgment as described above.

The CPU 12 repeatedly performs the processing for judging whether a face is included, and if it is judged that the face is included, processing for recording the information Pi+1, representing the newly detected facial position, in the system memory 34 until the user drives the release button to perform the photographing operation. Then, when the user performs the photographing operation by pressing the release button, the CPU 12 performs red-eye correction processing on the image data, which is obtained when the photographing operation is performed.

The red-eye correction processing may be performed by using the technique disclosed in Japanese Unexamined Patent Publication No. 10(1998)-233929. Specifically, a human face is detected in an image represented by image data, and pixels, which have the pixel value of red, are detected in the detected facial region. The pixel value of red is changed to the pixel value of black. In the present embodiment, the facial position may be specified based on the information Pi about the facial position, which is stored in the system memory 34 when the photographing operation is performed. Therefore, the processing for detecting the human face from the image represented by the image data is not required. Hence, processing for detecting the pixels, which have the pixel value of red, and if the red pixel is detected, processing for changing the color of the pixel to black may be performed only on the image in the rectangular region Ai, represented by the information Pi about the facial position.

Figure 12:
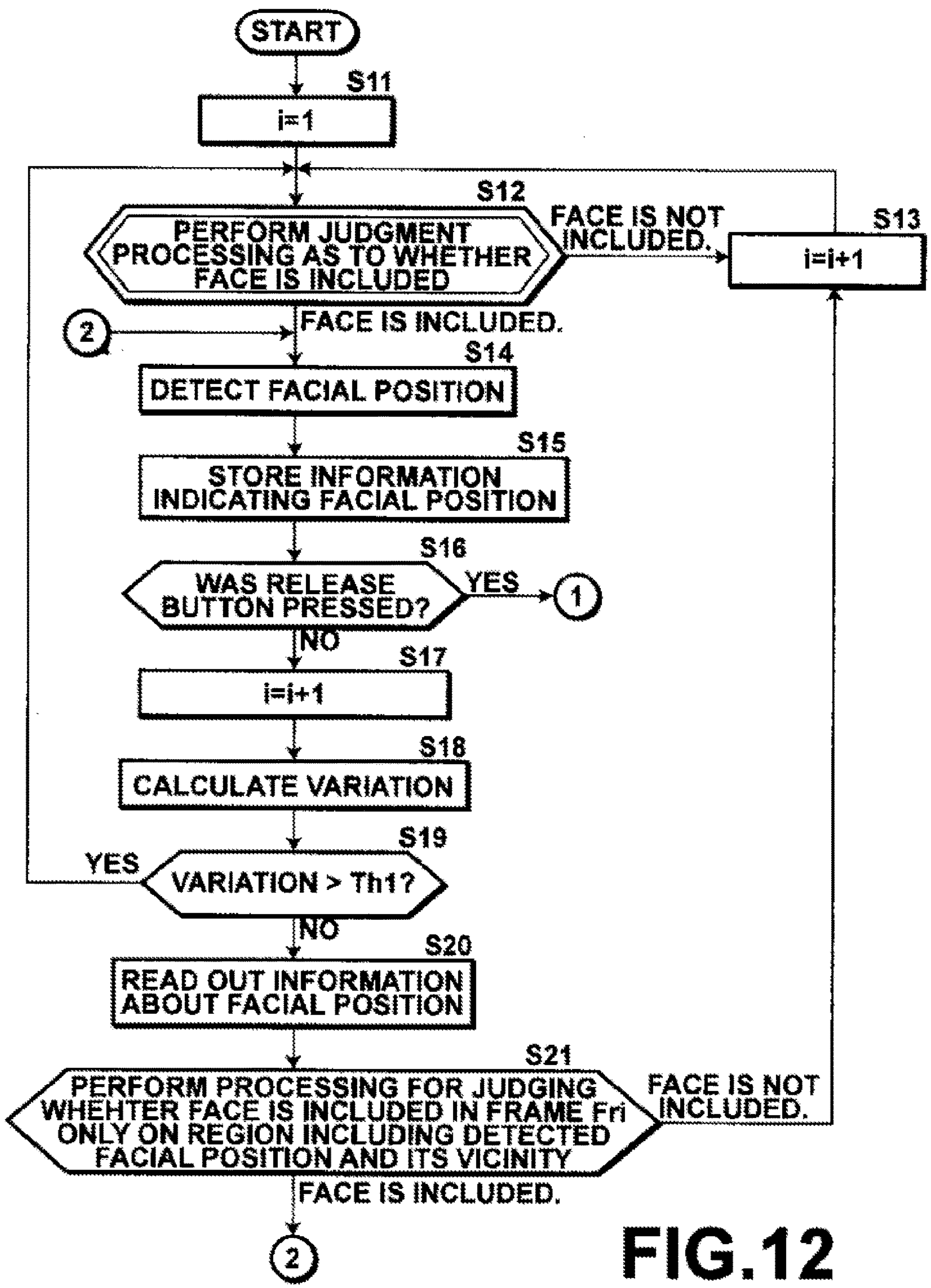
FIG. 12 is a flow chart (No. 1) illustrating processing in an embodiment of the present invention.
Figure 13:
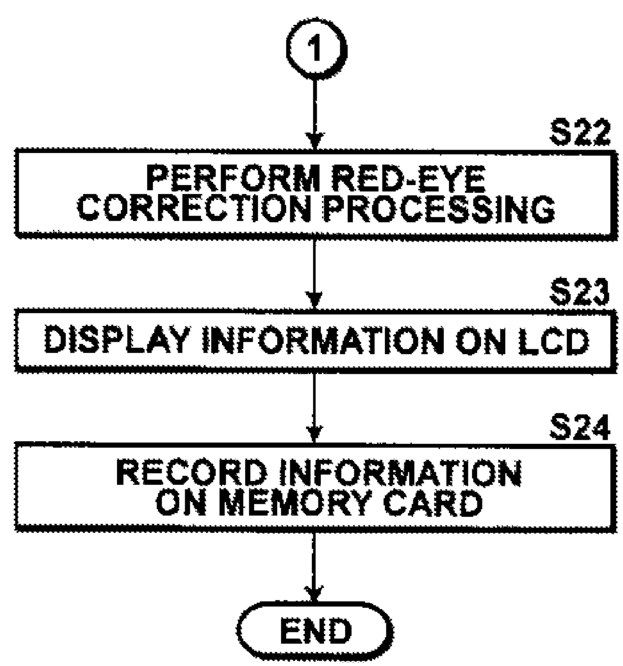
FIG. 13 is a flow chart (No. 2) illustrating processing in an embodiment of the present invention.

Next, processing performed in the present embodiment will be described. FIGS. 12 and 13 are flow charts illustrating the processing performed in the present embodiment. Processing starts when the user switches the mode of the digital camera 1 to a photography mode. First, the CPU 12 sets a first frame Fri (i=1) as a frame, on which processing for judging whether a face is included is performed (step S11). Then, the CPU 12 performs processing for judging whether a face is included in the frame Fri (step S12).

Figure 14:
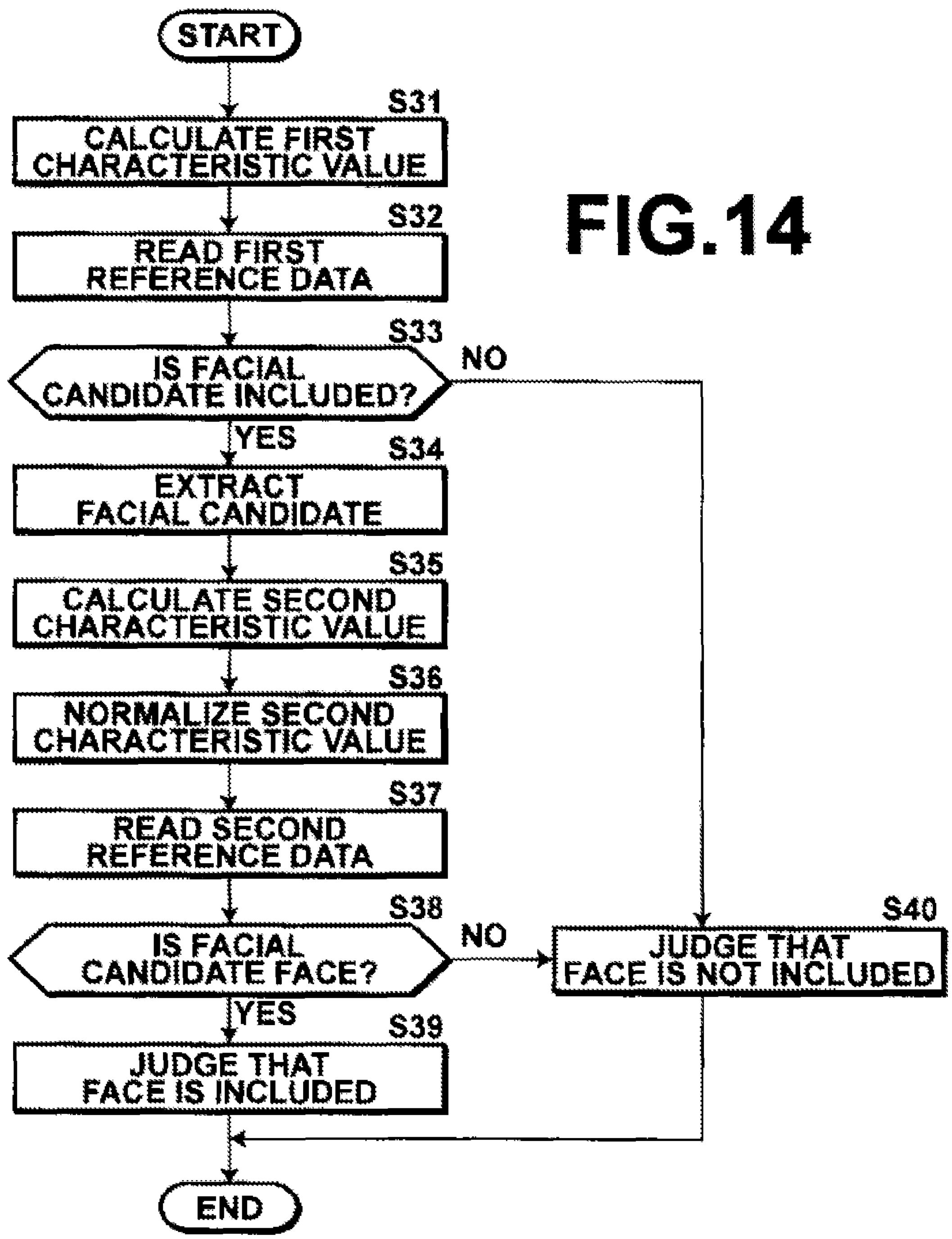
FIG. 14 is a flow chart illustrating processing for judging whether a face is included.

FIG. 14 is a flow chart illustrating processing for judging whether a face is included. First, the CPU 12 calculates the direction of the gradient vector K in the frame Fri at each stage of enlargement or reduction and rotation of the frame Fri as the first characteristic value C1 (step S31). Then, the CPU 12 reads out the first reference data R1 from the system memory 34 (step S32), and performs first discrimination for discriminating whether a facial candidate is included in the frame Fri (step S33).

If step S33 is YES, the CPU 12 extracts the facial candidate from the frame Fri (step S34). Here, the CPU 12 may extract a plurality of facial candidates. Next, the CPU 12 calculates the second characteristic value C2 in the facial candidate at each stage of enlargement or reduction and rotation of the facial candidate (step S35). Then, the CPU 12 normalizes the second characteristic value C2 (step S36). The CPU 12 reads out the second reference data R2 from the system memory 34 (step 37), and performs the second discrimination for discriminating whether the facial candidate is a face (step S38).

If step S38 is YES, the CPU 12 judges that the frame Fri includes a face (step S39), and processing ends.

If steps S33 and S38 are NO, the CPU 12 judges that the frame Fri does not include a face (step S40), and processing ends.

If it is judged that a face is not included, the CPU 12 changes the processing object to the next frame, which is a frame after predetermined time (i=i+1, step S13), and processing goes back to step S12. If it is judged that a face is included, the facial position is detected (step S14), and the information Pi, which represents the facial position, is stored in the system memory 34 (step S15). Then, the CPU 12 judges whether the user has performed the photographing operation by pressing the release button (step S16).

If step S16 is NO, the CPU 12 changes the processing object to the next frame, which is a frame after predetermined time (step S17), and calculates the variation |ΔM| of the image between the frame Fri+1 and the frame Fri (step S18). The CPU 12 judges whether the variation |ΔM| exceeds the threshold value Th1 (step S19). If step S19 is YES, CPU 12 judges that the scene is switched between the two frames of the frame Fri and the frame Fri+1. Then, the processing returns to step S12 so that the processing for judging whether a face is included is performed on the whole frame Fri+1 in a similar manner to the processing as described above.

If step S19 is NO, the CPU 12 judges that the scene is not switched between the two frames of the frame Fri and the frame Fri+1, and reads out the information Pi about the facial position, stored in the system memory 34 (step S20). Regarding the frame Fri+1, the CPU 12 performs judgment processing only on the facial position, detected in the frame Fri, and the vicinity of the facial position, to judge whether a face is included in the frame Fri+1 (step S21). If it is judged that a face is not included, processing goes back to step S13. If it is judged that a face is included, the processing goes back to step S14, and the facial position is detected. In step S15, the information Pi, which represents the facial position, is stored in the system memory 34.

If step S16 is YES, red-eye correction processing is performed on the image data, which is obtained when the photographing operation is performed (step S22). Then, the image data after red-eye correction processing is displayed on the LCD (Liquid Crystal Display) 40 (step S23). Further, the image data is recorded on the memory card 30 (step S24), and photography processing ends.

Here, when a photograph is taken with the digital camera 1, after composition is determined, a few seconds are required before the release means is driven. In many cases, the subject does not move during the few seconds. Therefore, judgment is made, in a predetermined time interval, as to whether a face is included in the frame, and if it is judged that the face is included, the facial position is newly detected and stored in the system memory 34. Accordingly, the facial position, which is stored in the system memory 34, corresponds to the position of a face included in the image represented by image data, which is obtained by the photographing operation. Hence, when red-eye correction processing is performed on the image data obtained by photographing, if the information Pi about the facial position is used, detection of the face in the image, which is represented by the image data, is not required. Accordingly, time required for the red-eye correction processing can be reduced in the present embodiment. Further, wait time till displaying the image data, obtained by photographing, on the LCD 40 or time till enabling the user to take a photograph of the next image can be reduced. Consequently, a photographer can be relieved from stress, which he/she will feel if the wait time is long.

Further, processing may be performed to judge whether the variation |ΔM| of the image between the two frames of the frame Fri and the frame Fri+1 exceeds the threshold value Th1, and if the variation |ΔM| is less than or equal to the threshold value Th1, the processing for judging whether a face is included may be performed only on the facial position recorded in the system memory 34 and the region in the vicinity of the facial position in the frame Fri+1. Accordingly, if the scene is not switched between the two frames of the frames Fri and the frame Fri+1, it is not required to perform the processing, on the whole frame Fri+1, to judge whether a face is included. Therefore, processing time for judging whether a face is included may be reduced.

In the embodiments as described above, the average values of the pixel values in each of the frame Fri and the frame Fri+1 are used for obtaining the variation |ΔM| of image between the frame Fri and the frame Fri+1. Alternatively, as illustrated in FIGS. 15A and 15B, histograms Hi and Hi+1, which show the relationships between the pixel values and the frequencies in each of the frame Fri and the frame Fri+1, may be obtained, and the difference (namely, the area of the shaded part in FIG. 15C) in the shapes of the histograms Hi and Hi+1. may be used as the variation. In this case, processing for judging whether the scene has been switched may be performed by judging whether the variation exceeds a predetermined threshold value (referred to as Th2).

Further, in the embodiments as described above, the red-eye correction processing is performed on the image data, which is obtained by performing a photographing operation. However, a human face may be detected in an image, and processing for improving the image quality of the face, such as suppressing the noise and changing the density or gradation of the detected face, may be performed on the image data. In this case, if the information Pi, which represents the facial position, and which is stored in the system memory 34, is used, processing for detecting the face is not required. Therefore, the processing time may be reduced.

In the embodiments as described above, only a set of image data is obtained by performing the photo graphing operation. However, a plurality of frames which are temporally precedent and subsequent frames of the image data, obtained by performing the photographing operation, may be obtained as a set of image data. For example, as illustrated in FIG. 16, when the photography mode is set, 30 frames are sequentially obtained per second. A plurality of frames (7 frames in this case), which are temporally precedent and/or subsequent frames of the frame (hereinafter referred to a standard frame Frs), which is obtained when the photographing operation is performed, may be obtained as a set of image data. Further, it is obvious that, only a plurality of temporally precedent frames or a plurality of temporally subsequent frames may be obtained as a set of image data.

As described above, for obtaining a plurality of frames as image data, judgment may be made as to whether eyes in a face included in the standard frame Frs are closed. If the eyes are closed, a frame including a face with open eyes may be selected from the plurality of frames. Further, judgment may be made as to whether a face included in the standard frame Frs is a smiling face, and if the face is not a smiling face, a frame including a smiling face may be selected from the plurality of frames.

Here, for judging whether the eyes are closed or whether the face is a smiling face, a face is required to be detected in an image. In the present embodiment, since the information Pi about the facial position, stored in the system memory 34, is used, processing for detecting the face is not required. Accordingly, processing time for judging whether the eyes are closed or whether the face is a smiling face may be reduced.

Further, in the present embodiment, the processing for judging whether a face is included in the frame Fri is performed by using the reference data R1 and R2, which has been obtained by using a machine learning method. However, it is obvious that other methods, such as a method for judging whether a shape, which conforms to a facial template, is included in the frame Fri by using the facial template, may also be used.

What is claimed is:

1. A non-transitory computer readable medium of a camera device, the computer readable medium storing a program for causing a processor to execute an image processing method, wherein the camera device generates a moving image of a subject by continuously taking photographs of the subject, the camera device including:

a display for displaying information including the moving image, a user interface that initiates a photographing operation to generate a photograph of the subject, the photograph comprising image data; and memory for storing information including the image data, the program comprising instructions for processing successive frames of the moving image until terminated responsive to a release input from a user, the processing comprising:

determining whether a human face is included in the frame;

detecting a facial position in the frame if the determining step determines that a face is included in the frame;

storing the detected facial position in the memory;

wherein the determining of whether a human face is included in the frame comprises:

determining whether a human face is included in a first frame of the successive frames;

if a human face is not determined to be in the first frame, repeating the determining on a next frame of the successive frames; and if a human face is determined to be in the first frame, determining whether a human face is included in a next frame of the successive frames; and wherein the determining of whether a human face is included in the next frame of the successive frames comprises:

processing only pixels in the next frame located in a region corresponding to a region of the first frame in which the human face was detected.

2. The non-transitory computer readable medium of claim 1, wherein the user interface comprises a button, wherein the release input is generated when the user presses the button.

3. The non-transitory computer readable medium of claim 1, wherein the memory comprises a frame memory for storing the image data.

4. The non-transitory computer readable medium of claim 1, wherein the determining of whether a human face is included in the frame comprises:

determining whether a human face is included in a first frame of the successive frames and, if not, repeating the determining on a next frame of the successive frames.

5. The non-transitory computer readable medium of claim 4, wherein the determining of whether a human face is included in the first frame of the successive frames comprises:

processing each pixel of the first frame.

6. The non-transitory computer readable medium of claim 4, wherein the determining of whether a human face is included in the first frame of the successive frames comprises: processing each pixel of the first frame to generate a characteristic value indicative of the presence of a human face.

7. The non-transitory computer readable medium of claim 4, wherein the first frame of the successive frames is preceded by a previous frame of the successive frames.

8. The non-transitory computer readable medium of claim 1, wherein the determining of whether a human face is included in the frame includes using reference data obtained by a machine learning technique.

9. The non-transitory computer readable medium of claim 1, wherein the program further comprises instructions for determining whether there is a smile in or near the facial position.

10. The non-transitory computer readable medium of claim 1, wherein the program further comprises instructions for determining whether eyes of the human face are closed, and if the eyes are closed, selecting a frame including a face with open eyes from a previous or subsequent frame of the successive frames.

11. Camera apparatus for generating a photograph of a subject, wherein the camera apparatus generates a moving image of the subject by continuously taking photographs of the subject, the moving image comprising multiple successive frames, with each frame including frame image data representing images in the frame, the camera apparatus comprising:

a display for displaying information including the moving image;

a release button that, when pressed, initiates a photographing operation to generate the photograph of the subject, the photograph comprising image data;

memory for storing information including the image data;

a central processing unit; and a computer readable medium storing a program for causing the central processing unit to process the successive frames of the moving image, the program comprising instructions for:

image processing the frame image data of each frame of the moving image until the release button is determined to have been pressed, the image processing comprising:

performing human facial analysis on the frame image data of the frame to determine whether the frame image data includes a human face;

detecting a facial position in the frame if the frame image data is determined to include a human face;

storing the detected facial position in the memory; and wherein the performing of human facial analysis comprises:

determining whether a human face is included in a first frame of the successive frames;

if a human face is not determined to be in the first frame, repeating the determining on a next frame of the successive frames; and if a human face is determined to be in the first frame, determining whether a human face is included in a next frame of the successive frames, and wherein the determining of whether a human face is included in the next frame of the successive frames comprises:

processing only pixels in the next frame located in a region corresponding to a region of the first frame in which the human face was detected.

12. Camera apparatus of claim 11, further comprising a photography unit.

13. Camera apparatus of claim 11, wherein the memory comprises a frame memory for storing the image data.

14. Camera apparatus of claim 11, wherein the performing of human facial analysis comprises:

determining whether a human face is included in a first frame of the successive frames and, if not, repeating the determining on a next frame of the successive frames.

15. Camera apparatus of claim 14, wherein the determining of whether a human face is included in the first frame of the successive frames comprises:

processing each pixel of the first frame.

16. Camera apparatus of claim 14, wherein the determining of whether a human face is included in the first frame of the successive frames comprises:

processing each pixel of the first frame to generate a characteristic value indicative of the presence of a human face.

17. Camera apparatus of claim 14, wherein the first frame of the successive frames is preceded by a previous frame of the successive frames.

18. Camera apparatus of claim 11, wherein the performing of human facial analysis includes using reference data obtained by a machine learning technique.

19. Camera apparatus of claim 11, wherein the program further comprises instructions for determining whether there is a smile in or near the facial position.

20. Camera apparatus of claim 11, wherein the program further comprises instructions for determining whether eyes of the human face are closed, and if the eyes are closed, selecting a frame including a face with open eyes from a previous or subsequent frame of the successive frames.

21. A photographing method for generating a photograph of a subject, wherein the method comprises:

generating a moving image of the subject by continuously taking photographs of the subject with a camera apparatus, the moving image comprising multiple successive frames, with each frame including frame image data representing images in the frame;

displaying information including the moving image on a display of the camera apparatus;

initiating a photographing operation to generate the photograph of the subject, the photograph comprising image data;

storing information including the image data; and processing the successive frames of the moving image using a processor of the camera apparatus, the processing including:

image processing the frame image data of each frame of the moving image until the photographing operation is initiated, the image processing comprising:

performing human facial analysis on the frame image data of the frame to determine whether the frame image data includes a human face;

detecting a facial position in the frame if the frame image data is determined to include a human face;

storing the detected facial position in a memory; and wherein the performing human facial analysis comprises:

determining whether a human face is included in a first frame of the successive frames;

if a human face is not determined to be in the first frame, repeating the determining on a next frame of the successive frames; and if a human face is determined to be in the first frame, determining whether a human face is included in a next frame of the successive frames; and wherein the determining of whether a human face is included in the next frame of the successive frames comprises:

processing only pixels in the next frame located in a region corresponding to a region of the first frame in which the human face was detected.

22. The method of claim 21, wherein the initiating the photography operation comprises a generating a release input.

23. The method of claim 22, wherein the release input is generated in response to a user pressing a button.

24. The method of claim 21, wherein the storing comprises storing the image data in a frame memory.

25. The method of claim 21, wherein the performing human facial analysis comprises:

determining whether a human face is included in a first frame of the successive frames and, if not, repeating the determining on a next frame of the successive frames.

26. The method of claim 25, wherein the determining of whether a human face is included in the first frame of the successive frames comprises:

processing each pixel of the first frame.

27. The method of claim 25, wherein the determining of whether a human face is included in the first frame of the successive frames comprises:

processing each pixel of the first frame to generate a characteristic value indicative of the presence of a human face.

28. The method of claim 25, wherein the first frame of the successive frames is preceded by a previous frame of the successive frames.

29. The method of claim 21, wherein the performing human facial analysis includes using reference data obtained by a machine learning technique.

30. The method of claim 21, further comprising determining whether there is a smile in or near the facial position.

31. The method of claim 21, further comprising determining whether eyes of the human face are closed, and if the eyes are closed, selecting a frame including a face with open eyes from a previous or subsequent frame of the successive frames of the frame.

* * * * *